United States Patent [19]

Brandsberg et al.

[11] Patent Number: 4,636,120
[45] Date of Patent: Jan. 13, 1987

[54] STUD/BOLT LOAD GAUGE

[75] Inventors: Timothy A. Brandsberg, Goode; Ronald C. Pillow, Lynchburg, both of Va.

[73] Assignee: The Babcock & Wilcox Company, New Orleans, La.

[21] Appl. No.: 869,474

[22] Filed: Jun. 2, 1986

[51] Int. Cl.⁴ .............................................. F16B 31/02
[52] U.S. Cl. ......................................... 411/14; 73/761
[58] Field of Search ................. 411/1, 5, 6, 8, 9, 10, 411/11, 12, 13, 14, 384, 383, 916; 73/761

[56] References Cited

U.S. PATENT DOCUMENTS

| | | | |
|---|---|---|---|
| 2,464,152 | 3/1949 | Ralston | 411/11 |
| 3,174,386 | 3/1965 | Lewis | |
| 3,476,009 | 11/1969 | Markey | 411/11 |
| 3,776,031 | 12/1973 | Trigg | 73/761 X |
| 3,823,639 | 7/1974 | Liber | 411/14 |
| 3,908,508 | 9/1975 | Payne | 411/14 |
| 4,159,483 | 6/1979 | Bettim | 411/11 X |
| 4,170,163 | 10/1979 | Payne | 411/14 |
| 4,205,572 | 6/1980 | Weiner | 411/8 X |
| 4,525,114 | 6/1985 | Hirst | 73/761 X |
| 4,553,124 | 11/1985 | Malicki | 73/761 X |
| 4,571,133 | 2/1986 | Lindow | 411/11 |

FOREIGN PATENT DOCUMENTS

| | | | |
|---|---|---|---|
| 2746689 | 2/1979 | Fed. Rep. of Germany | 411/8 |
| 2950254 | 6/1981 | Fed. Rep. of Germany | 411/13 |

OTHER PUBLICATIONS

NASA Tech Briefs 1982, p. 192.

Primary Examiner—Thomas J. Holko
Attorney, Agent, or Firm—Robert J. Edwards; D. Neil LaHaye

[57] ABSTRACT

A stud/bolt load gauge assembly. A gauge screw threadably engaged in a stud or bolt has a top, belleville, overload, and bottom washer mounted between the head of the bolt and the head of the gauge screw. All of the washers are movable until axial stress on the bolt equal to the minimum desired load causes the underload gap to be taken up by the gauge screw. Then only the overload washer is movable. The overload washer becomes immovable between the top and bottom washers when the bolt load is increased beyond the desired maximum load, causing compression of the belleville spring washer to a substantially flat state.

2 Claims, 2 Drawing Figures

STUD/BOLT LOAD GAUGE

BACKGROUND OF THE INVENTION

1. Field of the Invention

The present invention relates to load indicator washers and in particular to an assembly for providing underload and overload indication.

2. General Background

In many types of construction, it is frequently required that joints between two separate work pieces made with fasteners such as studs or bolts meet a certain minimum load along the longitudinal axis of the fastener. This minimum axial load is required to insure that the joint will withstand normal operational stresses. Also, joints are often designed with maximum axial loads. As an alternative to torque wrenches, which may not always provide a true representation of axial load, a variety of load indicators have been utilized in the known art.

U.S. Pat. No. 4,149,446 entitled "Load Indicator Washer" discloses a load indicator washer in the form of a parallelogram including bearing surfaces on one face which extend inwardly a short distance from two opposite ends of the washer. An arcuate portion between the bearing surfaces has a conical portion extending symmetrically thereabout and a hole to receive a bolt. The arcuate and conical portions each act as springs with the relative deflection of each indicating the load applied to a fastener such as a mine roof bolt.

U.S. Pat. No. 3,978,761 entitled "Fastener Assembly" discloses a flat washer, an elastically deformable washer, and a nut all enclosed in a shroud to insure use of the components in the proper order. Drive means coupled to the nut is designed to break at a predetermined torque level.

U.S. Pat. No. 4,571,133 entitled "Loading Washer Assembly" discloses a pair of rigid washers, each having radial upstanding ribs angularly offset relative to the other washer. A normally flat ring spring positioned between the washers is deformed into a wave spring to spring load the washers.

U.S. Pat. No. 3,174,386 entitled "Indicating Washer" discloses a stress indicating washer having a compressive column designed to collapse upon application of a predetermined axial stress when used in conjunction with a fastener such as an expansion bolt.

U.S. Pat. No. 3,476,009 entitled "Spring Washer" discloses an elastic load supporting washer of generally frustoconical shape having inner and outer surfaces of undulated configuration.

U.S. Pat. No. 4,006,661 entitled "Reusable Torque Limiting Fastening Device" discloses a torque nut with a recessed area which receives concave washers providing the necessary resistance to produce the desired bolt tensile load when the outer face of the nut contacts the work surface.

U.S. Pat. No. 4,020,734 entitled "Tension Indicator For Fastener Means" discloses a pair of washers having concave central portions which face in opposite directions in the assembled condition. Outwardly extending fingers on each washer interlock with the opposed washer and a specific compression between washers indicates that the desired load is achieved.

U.S. Pat. No. 4,029,379 entitled "Electrical Bus Duct With Torque Indication Nut" discloses a nut with an engaging section, a driving section and a bridging section which fractures upon reaching a predetermined value at the driving section.

U.S. Pat. No. 4,072,081 entitled "Tension Indicating Washer Unit" discloses a preassembled unit incorporating an upper washer, a lower conical washer, and a ring gauge clamped between the washers to prevent movement upon compression to a predetermined amount.

U.S. Pat. No. 4,205,572 entitled "Saw Blade Retainer And Kickback Clutch Assembly" discloses a blade clamping washer, spring washer, and blade screw formed as a permanent assembly in a retainer cup. Circular markings on the outer face of the clamping washer and spring washer provide a visual indication of proper tensioning.

U.S. Pat. No. 4,504,180 entitled "Multi-Headed Screw" discloses a screw having a thin neck portion designed to be sheared at a predetermined tightening torque.

The publication, NASA Tech Briefs, Winter 1982, discloses at page 192 a built-in gauge wherein a screw is attached through a bolt by a jamnut and a cruciform washer is positioned between the head of the bolt and the head of the screw. When the bolt is loaded with a minimum stress, the preset gap is taken up and the screw head clamps the cruciform washer and prevents it from rotating. This provides an indication that a minimum load has been reached but does not provide an indication if the maximum load is exceeded.

The known art provides a variety of washers aimed at supporting loads or indicating when a certain load is achieved but does not provide an assembly capable of indicating when a certain load is achieved in addition to providing overload and underload indications.

SUMMARY OF THE INVENTION

The present invention solves the above problem in a straightforward manner. What is provided is a washer stack assembly on a gauge rod or screw engaged in a bore through the head of the large stud or bolt to be used. A top washer, spring, overload washer, and bottom washer are positioned between the head of the gauge screw and the head of the stud or bolt. The gauge screw is engaged in the bore a predetermined depth and the stud or bolt is then installed. The entire washer assembly is free to spin until enough axial load is placed upon the stud to take up the underload gap. At this point, pressure of the spring against the top and bottom washers from the head of the gauge screw prevents movement of the top washer, spring, and bottom washer while allowing movement of the overload washer. Increasing the axial load beyond the desired level causes compression of the spring and binding of the overload washer. The proper load is indicated when the overload washer is free to spin but the top and bottom washers are not free to move. Underload is indicated when all washers are free to spin. Overload is indicated when all washers are not free to move.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
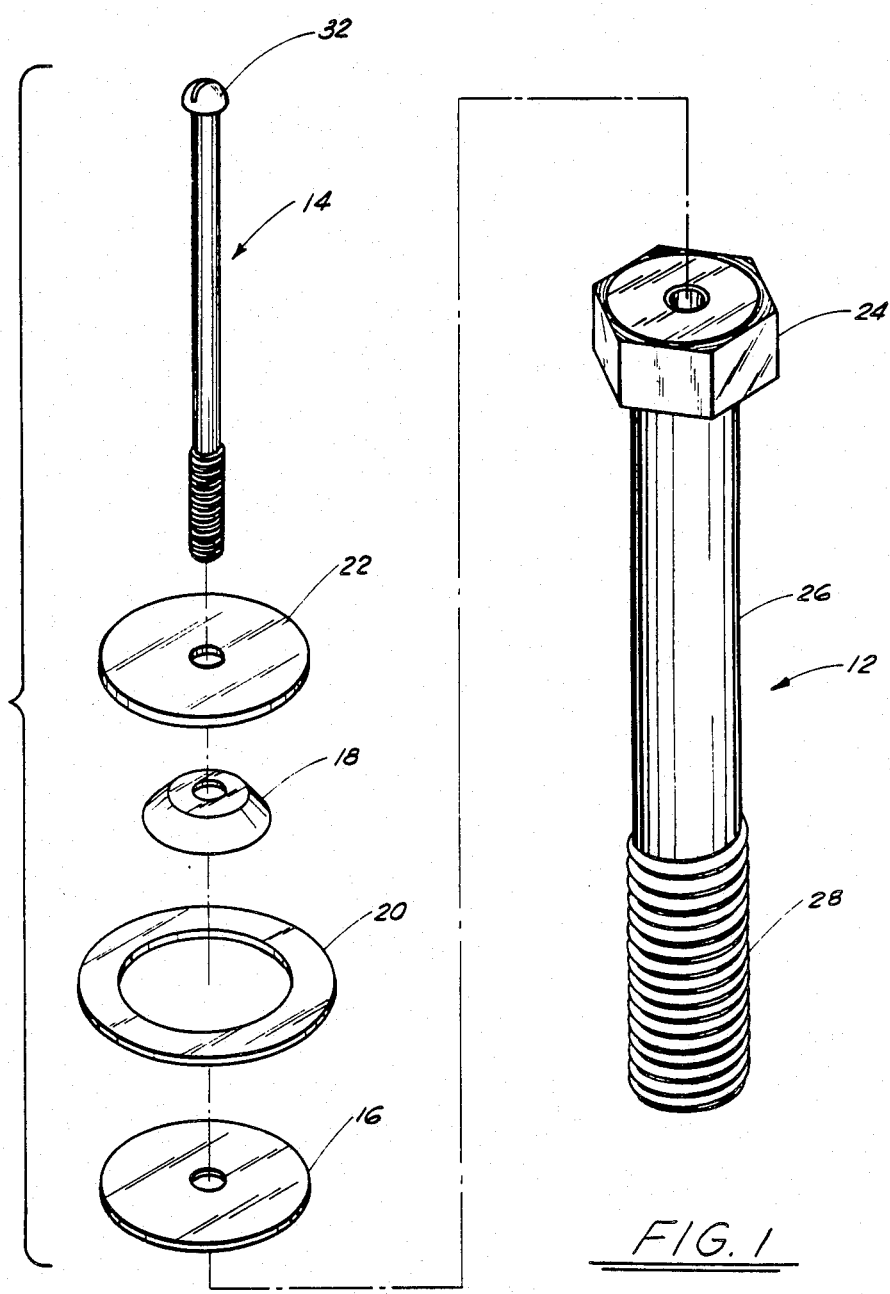
FIG. 1 is an exploded view of the invention.

Referring now to the drawings, it can be seen that the apparatus is generally referred to by the numeral 10. Bolt load gauge 10 is generally comprised of bolt 12, gauge rod or screw 14, bottom washer 16, spring 18, overload washer 20, and top washer 22. For purposes of the description, reference will be made to the use of the invention in conjunction with a bolt. However, it should be noted that the invention may be used with either a stud or bolt and the terms should be considered interchangeable for purposes of the description and claims. Bolt 12 is similar to standard bolts having a head 24, shank 26 and threaded section 28. Bolt 12 is also provided with a central bore 30 along its longitudinal axis which extends from head 24 through shank 26 into threaded section 28. Bore 30 is threaded at its lower end for threadably receiving gauge screw 14.

Gauge screw 14 is preferably formed from the same material as bolt 12 to prevent problems associated with different rates of expansion or contraction during heat transfer. Gauge screw 14 is threaded at its lower end for threadable engagement in bore 30. Head 32 provided on screw 14 is illustrated as being slotted but may be provided with wrench flats and serves to retain the washers in their assembled positions.

The washer stack assembly is comprised of a plurality of washers mounted on the shank of gauge screw 14 between bolt head 24 and gauge screw head 32. A first flat washer, bottom washer 16, lies adjacent bolt head 24. A second flat washer, overload washer 20, overlies bottom washer 16 and is provided with a central bore larger than the central bore in bottom washer 16. An elastically deformable spring 18 is preferably a belleville spring washer of a size such that it is received within the central bore of overload washer 20. Spring 18 and overload washer 20 are thus mounted in a coaxial manner in substantially the same plane overlying bottom washer 16. Spring washer 18 is capable of deflection from a concave to a substantially flat condition as axial stress on bolt 12 increases. A third flat washer, top washer 22, overlies spring washer 18 and overload washer 20 and is adjacent head 32 of gauge screw 14.

Figure 2:
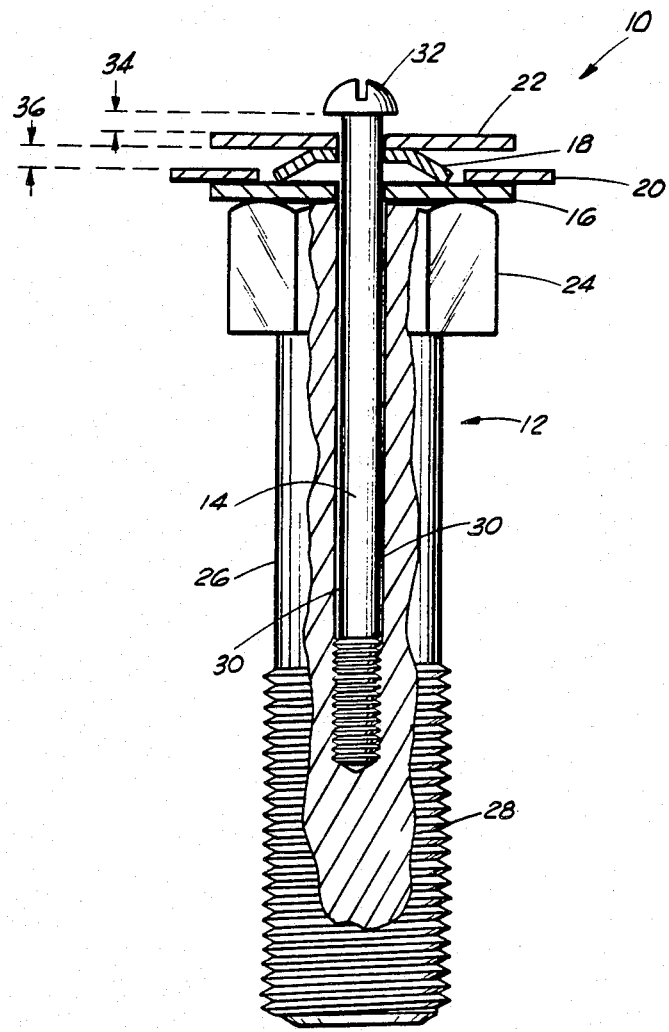
FIG. 2 is a partial cutaway view of the invention.

In operation, top washer 22, overload washer 20, belleville spring washer 18 and bottom washer 16 are mounted on the shank of gauge screw 14 as illustrated in FIG. 2. Gauge screw 14 is then threadably engaged in central bore 30 of bolt 12 to a predetermined depth to provide an underload gap 34, between gauge screw head 32 and top washer 22. Underload gap 34 is a function of the axial stress placed upon bolt 12 when utilized to fasten a joint. Overload gap 36 between overload washer 20 and top washer 22 is provided by the concave shape of spring washer 18 and is a function of the axial stress on bolt 12 which causes continued compression of spring washer 18 to a substantially flattened state. At the minimum load designed for the joint being fastened, the stress on bolt 12 causes bolt stretch which deflects or compresses belleville spring washer 18 a minimum amount to provide pressure on top washer 22 and bottom washer 16 and take up underload gap 34. Pressure from belleville spring washer 18 on bottom washer 16 and top washer 22 causes contact with heads 24 and 32 respectively. This prevents movement of bottom washer 16 and top washer 22 while still allowing movement of overload washer 20. This provides an indication that the desired minimum axial load has been reached. Further tightening of the joint beyond the desired maximum load causes increased bolt stretch and concurrent flattening of belleville spring washer 18. This takes up overload gap 36 and causes binding of overload washer 20 by either belleville spring washer 18 or bottom washer 16 and top washer 22 to prevent movement thereof. This provides an indication that the desired maximum axial load has been exceeded. Belleville spring washer 18 is preferably mounted as illustrated such that its concave side faces bolt head 24. Three load level indications are provided. All washers of the assembly are movable in an underload condition when the minimum desired load has not been reached. When the desired load level has been reached, only the overload washer is movable. None of the washers are movable when the desired load level has been exceeded. Thus, it is seen that bolt load gauge 10 provides an indicator of the application and maintenance of proper axial load which is easily monitored without the need for specialized training of personnel.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A bolt load gauge, comprising:
   a. a bolt having a longitudinal bore, said bore being threaded at its lower end;
   b. a gauge screw threadably engaged in said longitudinal bore;
   c. a washer stack assembly mounted on said gauge screw comprising:
      i. a first flat washer adjacent the head of said bolt;
      ii. a spring washer providing an overload gap and being compressible to take up said overload gap;
      iii. a second flat washer overlying said first flat washer and having a central bore larger than said first flat washer adapted to receive said spring washer; and
      iv. a third flat washer overlying said second flat washer and said spring washer; and
   d. said gauge screw being threaded to a depth in said longitudinal bore which provides an underload gap wherein all of said washers are movable.

2. The apparatus of claim 1, wherein said spring washer comprises a belleville spring washer.

* * * * *